United States Patent
Nakao

(10) Patent No.: US 7,218,414 B2
(45) Date of Patent: May 15, 2007

(54) APPARATUS AND METHOD FOR RECORDING DOCUMENT DESCRIBED IN MARKUP LANGUAGE

(75) Inventor: Muneki Nakao, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 1024 days.

(21) Appl. No.: 10/391,012

(22) Filed: Mar. 19, 2003

(65) Prior Publication Data

US 2003/0197880 A1    Oct. 23, 2003

(30) Foreign Application Priority Data

Mar. 22, 2002   (JP)   ............... 2002-081253
Aug. 6, 2002    (JP)   ............... 2002-229017

(51) Int. Cl.
   G06F 15/00   (2006.01)
   G06F 3/00    (2006.01)
   B41J 1/00    (2006.01)
   G03F 3/08    (2006.01)
   G06K 9/00    (2006.01)

(52) U.S. Cl. .............. 358/1.9; 358/518; 382/162; 382/167; 715/513; 715/760

(58) Field of Classification Search ............... 358/1.9, 358/518; 382/162, 167; 715/513, 760
See application file for complete search history.

(56) References Cited

U.S. PATENT DOCUMENTS 6,587,225 B1 * 7/2003 Sakatani et al. ............. 358/1.9
6,593,935 B2 * 7/2003 Imaizumi et al. ............ 345/619
7,139,099 B2 * 11/2006 Hashizume et al. ......... 358/2.1
2004/0128348 A1 * 7/2004 Gilbert et al. ............... 709/203

FOREIGN PATENT DOCUMENTS

| EP | 0 255 127    | 2/1988  |
| EP | 0 493 085    | 7/1992  |
| JP | 61-173594    | 8/1986  |
| JP | 3-166592     | 7/1991  |
| JP | 7-222012     | 8/1995  |
| JP | 10-067127    | 3/1998  |
| JP | 2000-134489  | 5/2000  |
| JP | 2000-184210  | 6/2000  |
| JP | 2000-330908  | 11/2000 |
| JP | 2000-333031  | 11/2000 |
| JP | 2001-237783  | 8/2001  |
| JP | 2001-268377  | 9/2001  |

* cited by examiner

*Primary Examiner*—Kimberly Williams
*Assistant Examiner*—Charlotte M Baker
(74) *Attorney, Agent, or Firm*—Fitzpatrick, Cella, Harper & Scinto

(57) ABSTRACT

This invention has as its object to provide a recording apparatus which prints a document described in a markup language to be easily viewable. To accomplish this, a color or monochrome mode is determined depending on the type of cartridge. Downloaded HTML data is analyzed to extract background data and character data. In the monochrome mode, an image is recorded after the background data is converted into white image data, and the character data is converted into black image data.

17 Claims, 13 Drawing Sheets

FIG. 7

- TOWN INFORMATION
- BBS
- FREE SERVICE
- SEARCH ENGINE
- CONTACT US
- QUESTIONNAIRE

CONTENTS DISPLAY

→

- TOWN INFORMATION
- BBS
- FREE SERVICE
- SEARCH ENGINE
- CONTACT US
- QUESTIONNAIRE

CONTENTS PRINT

FIG. 8

TOWN INFORMATION
BBS
FREE SERVICE
SEARCH ENGINE
CONTACT US
QUESTIONNAIRE

CONTENTS DISPLAY

→

- TOWN INFORMATION
- BBS
- FREE SERVICE
- SEARCH ENGINE
- CONTACT US
- QUESTIONNAIRE

CONTENTS PRINT

FIG. 11
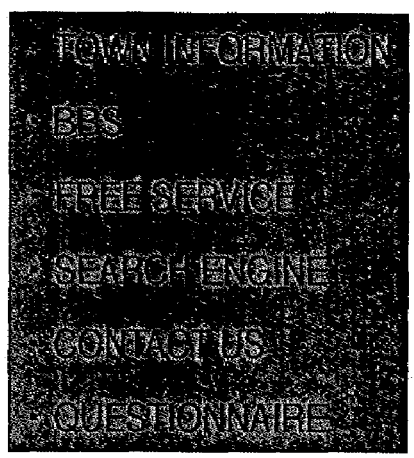
CONTENTS DISPLAY
CONTENTS PRINT

CONTENTS DISPLAY

CONTENTS PRINT

CONTENTS DISPLAY

CONTENTS PRINT

APPARATUS AND METHOD FOR RECORDING DOCUMENT DESCRIBED IN MARKUP LANGUAGE

FIELD OF THE INVENTION

The present invention relates to an apparatus and method for recording a document described in a markup language.

BACKGROUND OF THE INVENTION

In recent years, recording apparatuses such as a facsimile, telephone set, and the like, which have both a markup language analysis function and a print function, have been developed.

Some of such recording apparatuses can establish connection to the Internet to easily browse data stored in Web servers.

However, when a recording apparatus such as a conventional printer-integrated Internet terminal or the like prints color contents, text information or the like cannot be selectively and clearly printed out.

SUMMARY OF THE INVENTION

Accordingly, an object of the present invention is to provide an apparatus and method, which can print a document described in a markup language in a way which is easy to view.

According to the present invention, the foregoing object is attained by providing a recording apparatus comprising: input means for inputting document data described in a markup language; analysis means for analyzing the document data to extract background data and character data; conversion means for converting a color of at least one of the background data and character data so as to prevent background and character colors from being approximate colors; and recording means for recording an image that has executed color conversion by the conversion means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 shows a print sample of a conventional contents monochrome print result;

FIG. 8 shows a sample of a contents monochrome print result of the recording apparatus according to the first embodiment of the present invention;

FIG. 11 shows a sample of a conventional contents print result;

DETAILED DESCRIPTION OF THE PREFERRED EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Note that background data indicates an image which is laid out on the back side of characters and the like, and is not limited to, e.g., data designated by a background tag in an HTML document but also includes data designated by an image tag and background color tag.

Also, the background color indicates the color of an image which is laid out on the back side of characters and the like, and is not limited to, e.g., data designated by a background color tag in an HTML document but also includes colors derived from data designated by an image tag and background tag.

Furthermore, a character margin portion means a margin portion upon rasterizing a character, and is a concept that includes a region which serves as a background upon bitmap-rasterizing character data included in HTML data on the basis of font data.

First Embodiment

Figure 1:
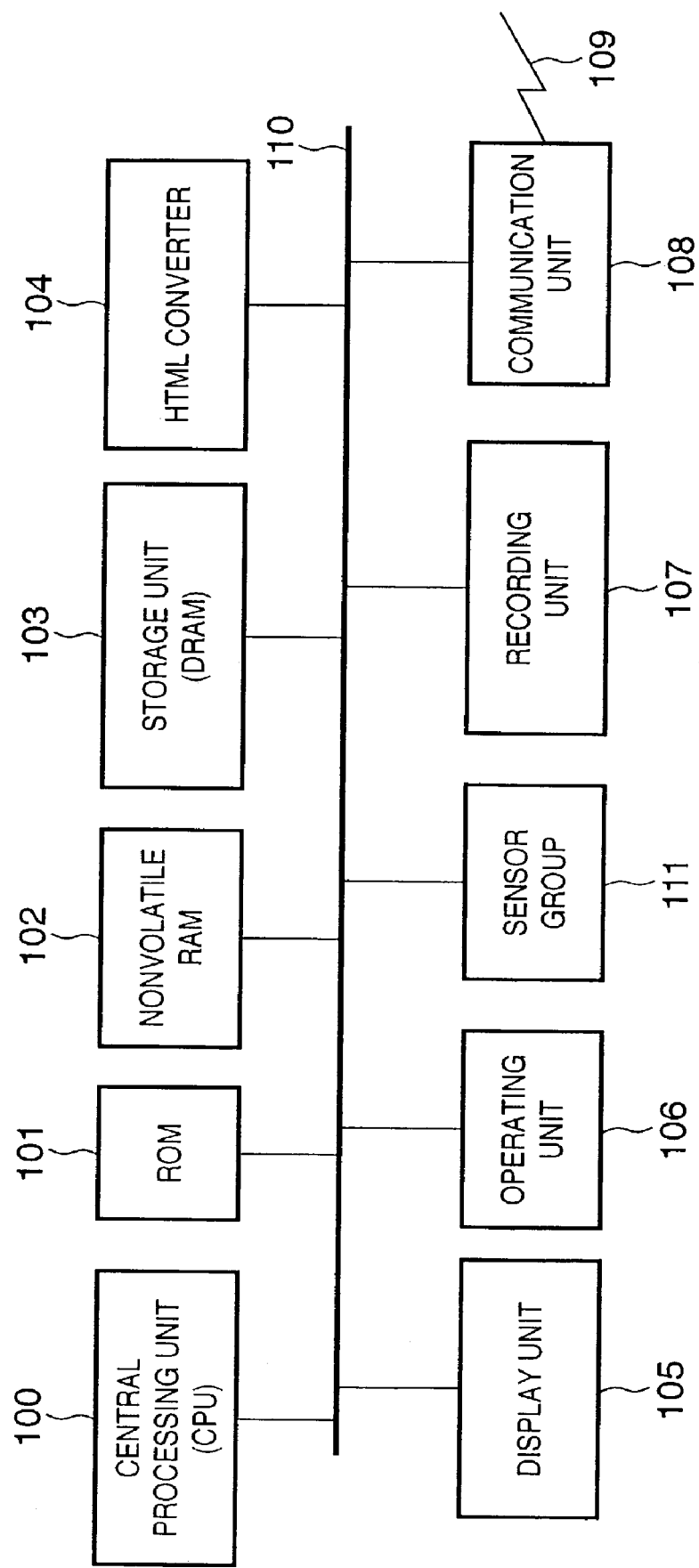
FIG. 1 is a block diagram showing the arrangement of a recording apparatus according to the first embodiment of the present invention.

A recording apparatus with a Web browser function according to the first embodiment of the present invention will be explained below. FIG. 1 is a block diagram showing a sample of the arrangement of the recording apparatus with a Web browser function of this embodiment.

Referring to FIG. 1, reference numeral 100 denotes a central processing unit (CPU) for controlling the overall apparatus; 101, a ROM for storing programs and data; 102, a nonvolatile RAM for storing backup data of personal data, a phone directory data, and the like; and 103, a storage unit (DRAM) for storing CPU work data, HTML data, display data, recording data, and the like. Reference numeral 104 denotes an HTML converter for analyzing received HTML data and converting that data into display and recording data. Reference numeral 105 denotes a display unit for color-displaying received contents data, status data of the apparatus, and the like; 106, an operating unit comprising a ten-key pad and the like; 107, a recording unit such as a printer or the like for recording a received image and text; and 108, a communication unit comprising a modem and the like used to establish connection to a line 109 and to communicate with an external apparatus. Note that the respective processing units are connected via a system bus 110. Reference numeral 111 denotes a sensor group including a sensor for detecting the type and presence/absence of a cartridge as recording material storage means, a sensor for detecting the recording sheet size, a sensor for detecting the width of a document to be read, a sensor for detecting the presence/absence of a document, and the like.

Figure 2:
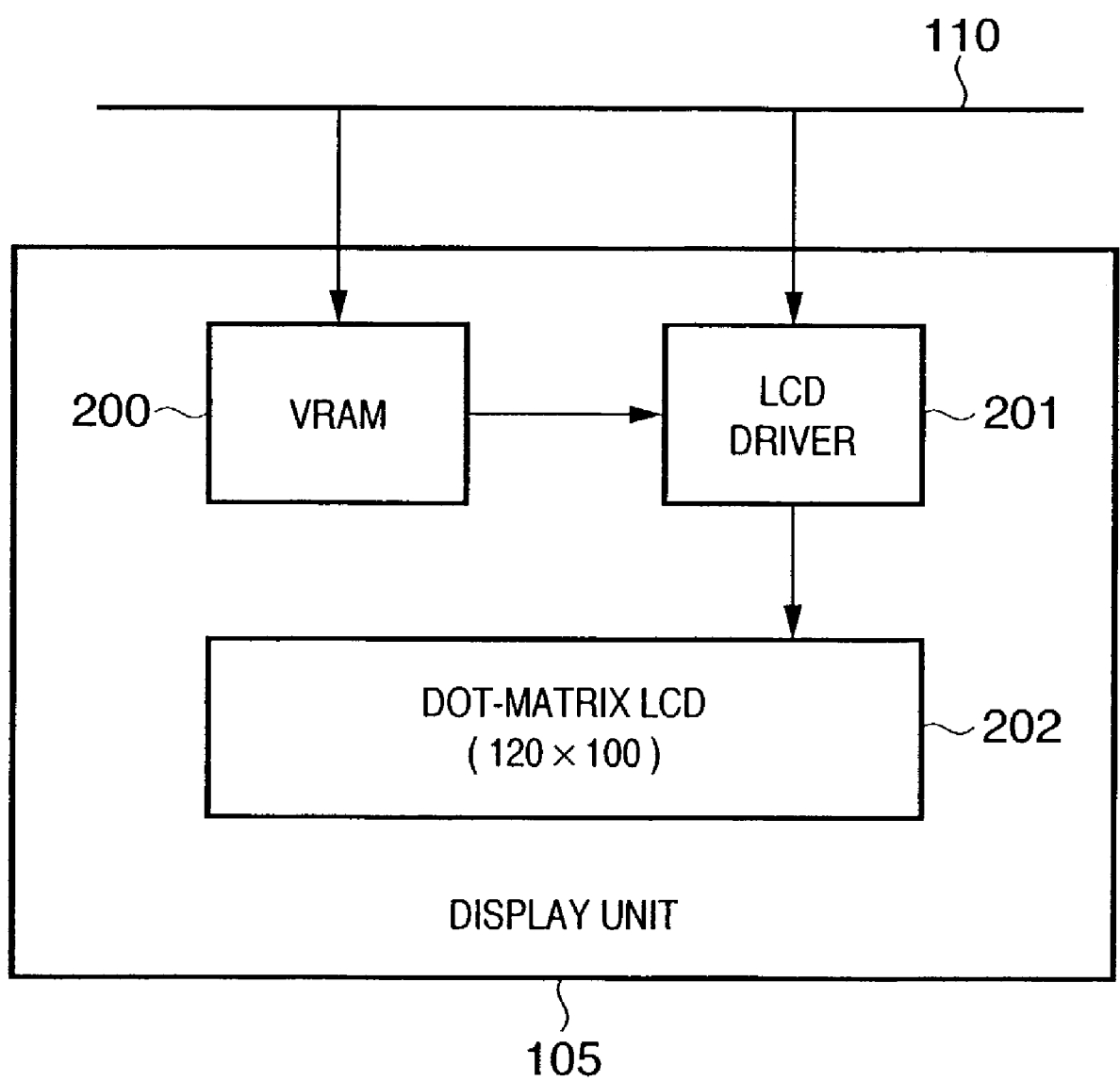
FIG. 2 is a block diagram showing the arrangement of a display unit of the recording apparatus according to the first embodiment of the present invention.

FIG. 2 shows the arrangement of the display unit 105. The display unit 105 includes a VRAM 200 for storing display data, and an LCD driver 201 for outputting the contents of the VRAM 200 to a dot-matrix LCD 202.

Figure 3:
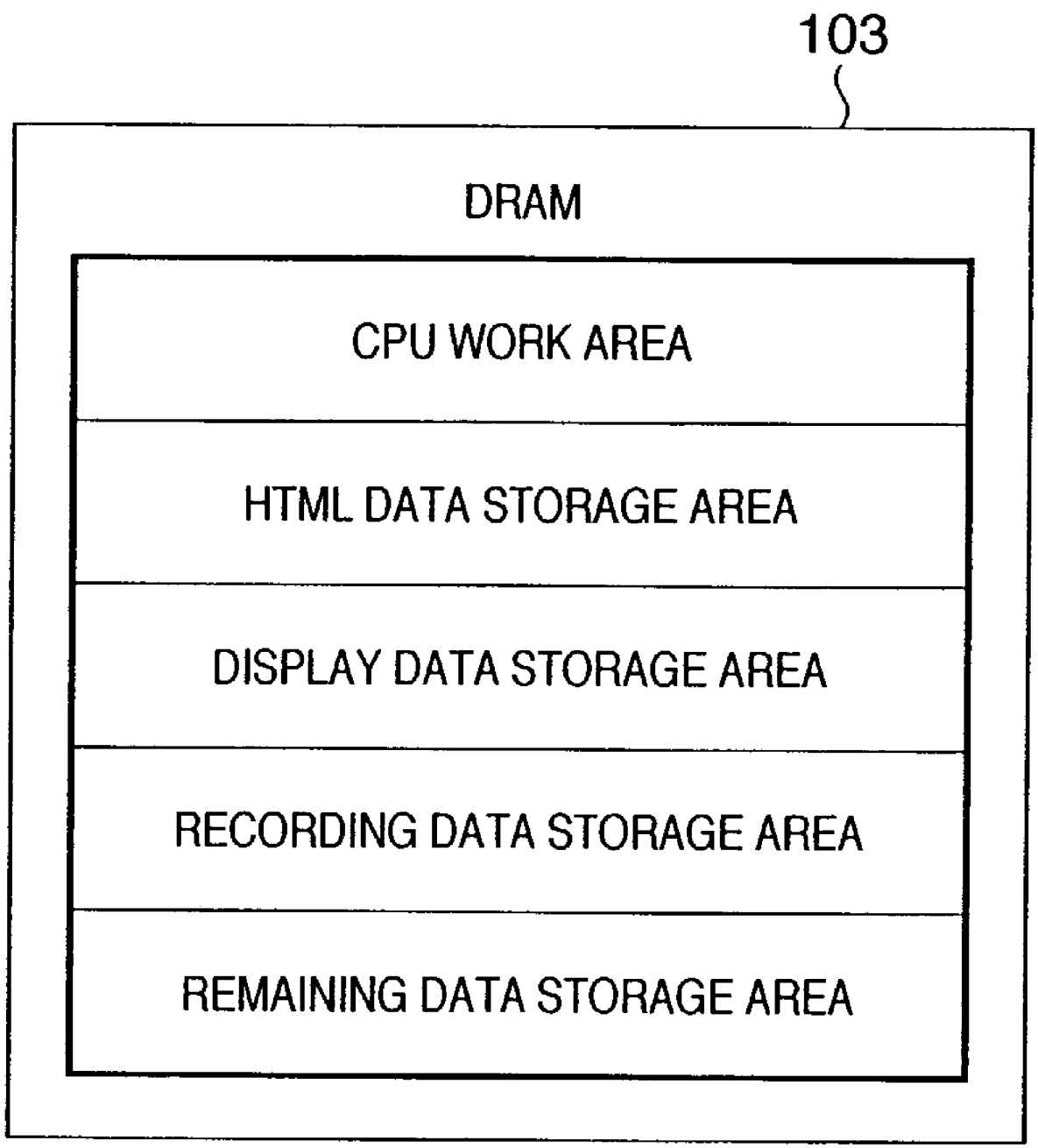
FIG. 3 is a block diagram showing the arrangement of a storage unit of the recording apparatus according to the first embodiment of the present invention.

FIG. 3 is a memory map showing the internal configuration of the DRAM 103. The DRAM 103 comprises a CPU work area used as a work area of the CPU 100, an HTML data storage area for storing received HTML data, a display data storage area for storing display data, a recording data storage area for storing print data, and a remaining data storage area for storing other data.

Figure 5:
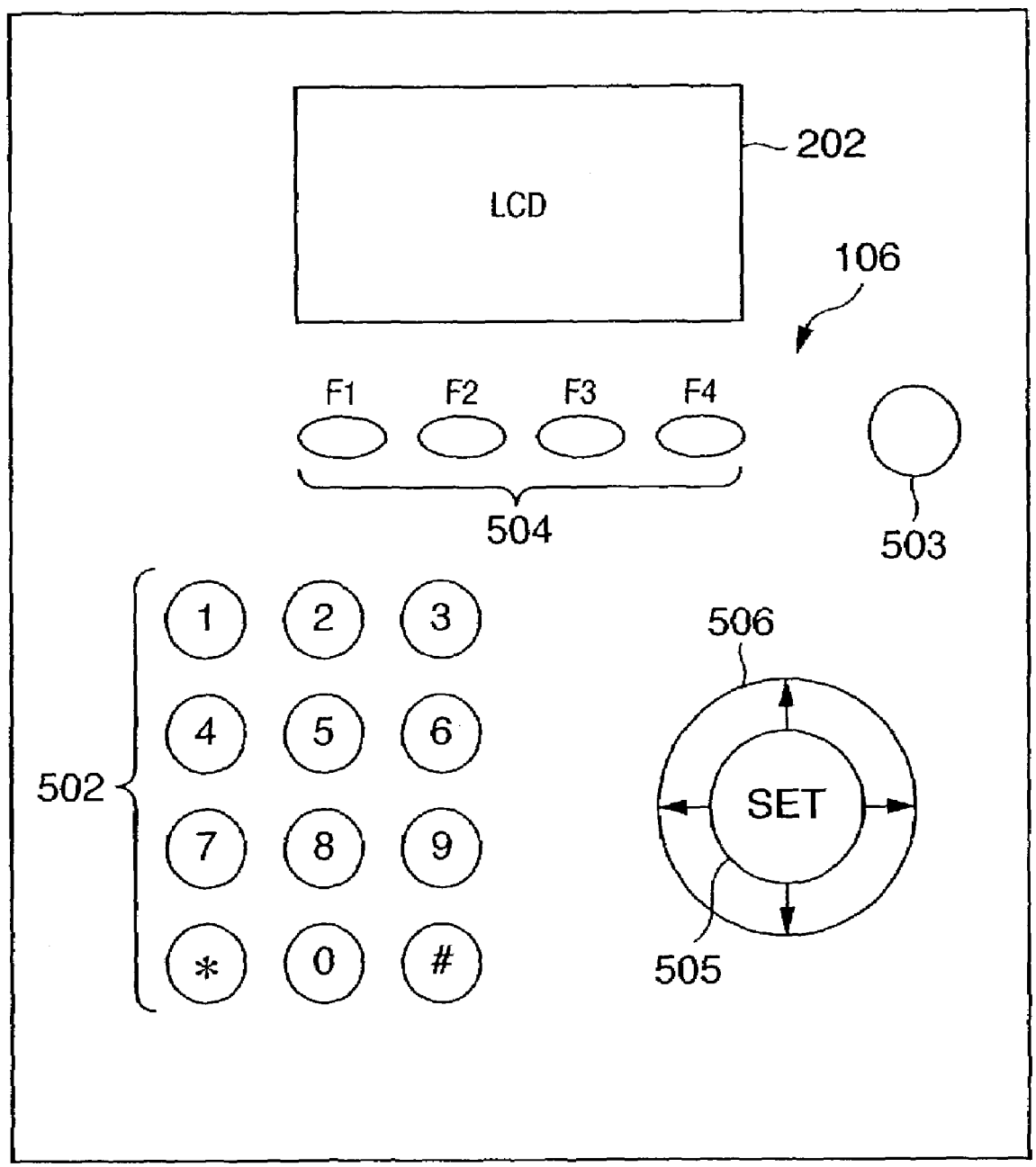
FIG. 5 is a block diagram showing the arrangement of an operating unit of the recording apparatus according to the first embodiment of the present invention.

FIG. 5 shows the outer appearance of the operating unit 106 of this facsimile. The operating unit 106 includes the LCD 202, a ten-key pad 502 used to input a phone number and the like, a registration key 503 used in a function setup process and the like, four function keys 504 used for multiple inputs, a set key 505 as a setup input key, and right, left, up, and down direction keys 506 used to move a cursor or the like on the display unit.

With this arrangement, operations from when HTML data is received until the HTML data is displayed on the LCD will be explained. Assume that the line has already been connected by a line connection operation.

HTML data is received via the line 109 and communication unit 108. The received HTML data is stored in the HTML data storage area of the storage unit 103.

The HTML data stored in the HTML data storage area of the storage unit 103 is passed to the HTML converter 104. An HTML data analysis core unit converts the HTML data into display data, which is stored in the display data area of the storage unit 103 again as display bitmap data. Furthermore, of the data stored in the display data area, data required for display is sent to the VRAM 200 of the display unit 105, is driven by the LCD driver 201, and is displayed on the dot-matrix LCD 202.

<Print Method>

Operations associated with a print method using the recording apparatus of this embodiment will be described below using FIG. 4.

Figure 4:
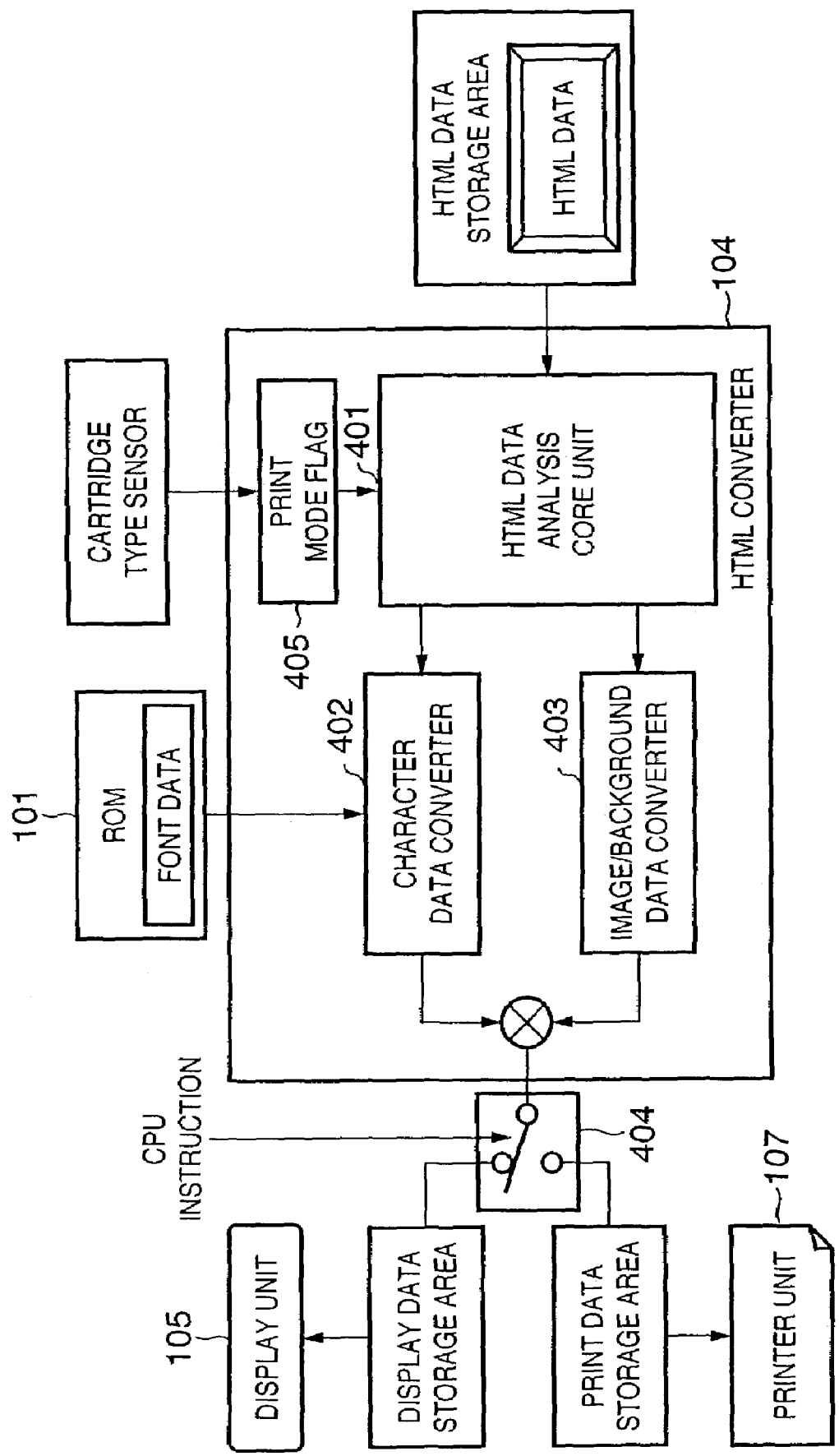
FIG. 4 is a block diagram showing the arrangement of an HTML data analysis module of the recording apparatus according to the first embodiment of the present invention.

FIG. 4 is a block diagram for explaining the operation of the HTML converter 104 according to this embodiment. In FIG. 4, an HTML data storage area, display data storage area, and recording data storage area are those assigned to the RAM 103.

The HTML data storage area is used to store HTML data, and image data such as GIF data, JPEG data, and the like, which are obtained from the Internet. The display data area is used to store data to be displayed on the LCD, and the recording data storage area is used to store data which is obtained by rasterizing HTML data and is used in a print process.

The HTML converter 104 includes an HTML data analysis core unit 401, character data converter 402, image/background data converter 403, and print mode flag 405.

The HTML data analysis core unit 401 fetches HTML data from the system bus, and analyzes character data, image data, layout data, tag data, and the like contained in the HTML data to separate the HTML data into character data and other data. The unit 401 then passes these separated data to the character data converter 402 and image/background data converter 403.

The character data converter 402 converts each character data into an image on the basis of code data received from the HTML data analysis core unit 401 and font data stored in the ROM 101.

More specifically, the number of characters required to begin a new line is detected on the basis of a character size and screen size, and a character string is generated. The character string is rasterized to bitmap data with reference to font data in the ROM 101. This bitmap data is output as display or print data.

Upon executing a print process, the state of the print mode flag 405 is checked. If the flag assumes a value indicating a color mode, font data is rasterized to bitmap data in accordance with the value of font color designation information designated in HTML data, thus generating print data. If the print mode flag 405 assumes a value indicating a monochrome print, font data is rasterized to monochrome (black) bitmap data irrespective of the value of font color designation information designated in the HTML data, thus generating print data.

Figure 6:
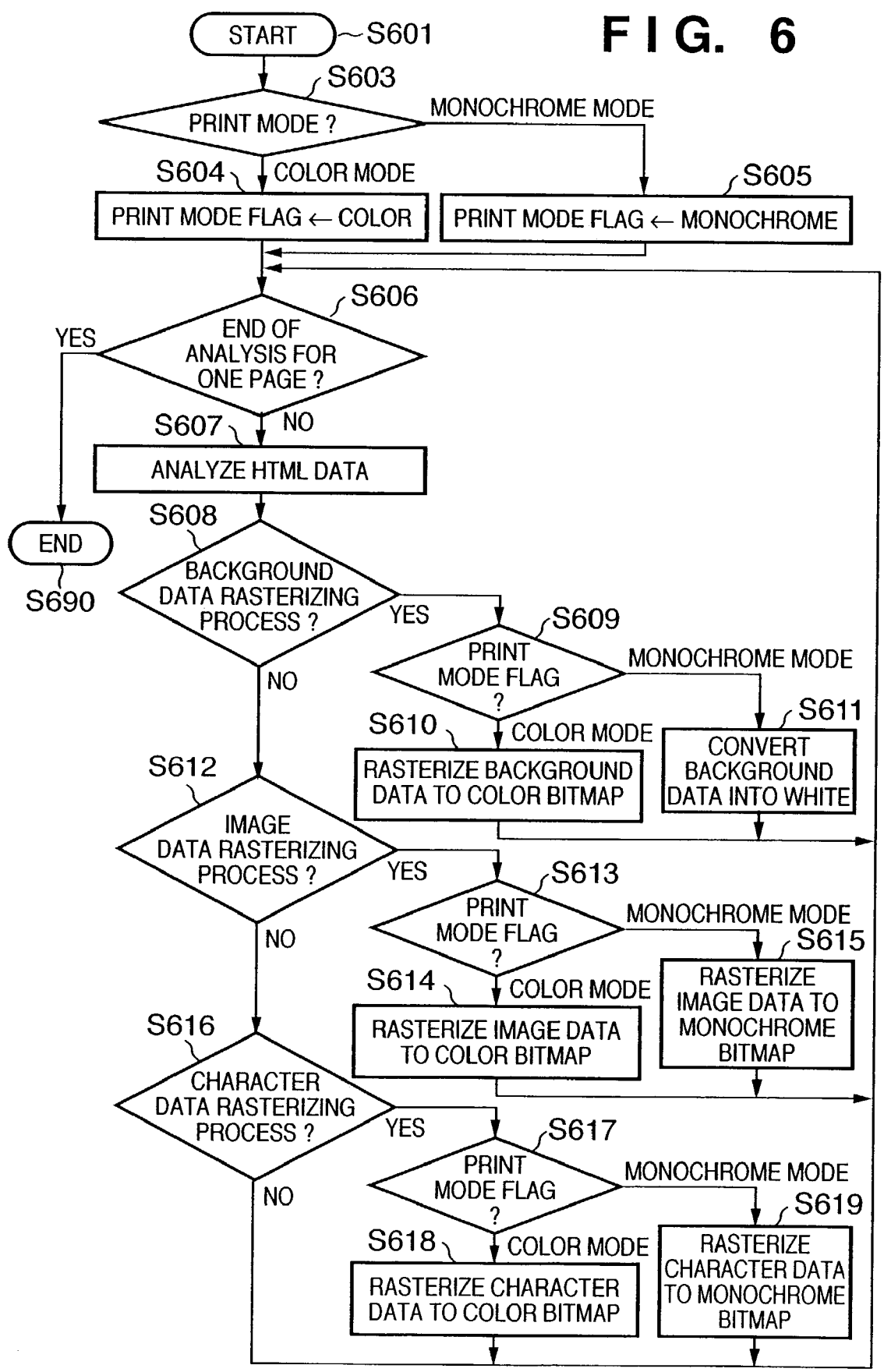
FIG. 6 is a flow chart showing the print operation of the recording apparatus according to the first embodiment of the present invention.

FIG. 6 is a flow chart showing an HTML data analysis process. If the user has pressed the function key 403 on the control panel to make a predetermined print start operation while displaying a given home page, the HTML data analysis process shown in FIG. 6 starts.

In step S603, the print mode is checked. More specifically, the type of ink cartridge set in the recording unit 107 is detected. If a color ink cartridge is set, a color mode is determined, and the flow advances to step S604. If a monochrome ink cartridge is set, a monochrome mode is determined, and the flow advances to step S605.

In step S604, a value (e.g., 1) indicating the color mode is set in the print mode flag. In step S605, a value (e.g., 2) indicating the monochrome mode is set in the print mode flag.

In this embodiment, the color/monochrome mode is determined by detecting the type of cartridge. Alternatively, the color or monochrome mode may be selected in accordance with a user's setup input. This method is particularly effective if the mode cannot be determined based on the type of cartridge. For example, in some cases, black is generated by mixing magenta, cyan, and yellow inks at 1:1:1 without using any black ink.

It is checked in step S606 if analysis for one Web page is complete. If YES in step S606, the flow advances to step S690 to execute a print end process.

On the other hand, if it is determined in step S606 that analysis for one Web page is not complete yet, the flow advances to step S607 to analyze HTML data. More specifically, the HTML data analysis core unit 401 analyzes the HTML tags of contents data. As a result of analysis of tags, if a tag (background tag or the like) that indicates background data which is to be laid out on the back side of image or character data is detected, the flow advances from step S608 to step S609 to start a background data rendering process.

It is checked in step S609 based on the print mode flag if this rendering process is to be executed in the monochrome or color mode. If the print mode flag indicates the color mode, the flow advances to step S610 to rasterize background data to color bitmap data. On the other hand, if the print mode flag indicates the monochrome mode, the flow advances to step S611 to set background portion rendering data of a character font to be white while ignoring color designation information and image information associated with a background.

Upon completion of the rendering process for one tag data, the flow returns to step S606 to start analysis of the next tag data.

As a result of analysis of HTML data in step S607, if a tag indicating image data is detected, the flow advances to step S613 via steps S608 and S612. If the print mode flag indicates the color mode, the flow further advances to step S614 to rasterize image data to color bitmap data. On the other hand, if the print mode flag indicates the monochrome mode, the flow advances to step S615 to set monochrome image data.

As a result of analysis of HTML data in step S607, if a tag indicating character data is detected, the flow advances to step S617 via steps S608, S612, and S616. It is determined in step S617 whether or not the print mode flag indicates the color mode. If the print mode flag indicates the color mode, the flow advances to step S618 to rasterize character data to color bitmap data. On the other hand, if the print mode flag indicates the monochrome mode, the flow advances to step S619 to rasterize character data to a monochrome bitmap image so as to print a black character.

The HTML data rasterizing processes in steps S607 to S619 are repeated for all data of one Web page, the print instruction of which has been issued.

FIG. 7 is an explanatory view of a case wherein color contents are printed as a monochrome image by a conventional apparatus.

The left image of FIG. 7 depicts source contents data. If background data is laid out on a background portion, and a background color or background image color has relatively dark color appearance, characters are normally displayed using white character font or one having relatively light tone appearance; the legibility of characters is improved by setting a high contrast between character font and its background color. Although not shown, by assigning different colors with the same luminance to the background and character in place of the luminance difference between the background and character, the difference between the background and character font is clarified to improve legibility.

By contrast, the right image in FIG. 7 depicts a case wherein such contents data is printed as a monochrome image by the conventional apparatus.

In this way, the conventional apparatus prints the background portion of character font in gray to have a similar luminance to that of the designated background color, and renders character font in a single color such as black or the like. For this reason, the contrast between the background color and character font character becomes low on the monochrome print image, thus impairing the legibility of characters.

This is because a markup language such as CHTML (compact HTML) or the like as a subset of HTML has some restrictions on a description language used to create home page contents, i.e., it comprises a background color designation function but does not comprise any character decoration designation function, and can designate a background color but cannot designate a character color in contents, for the sake of simplicity.

As another reason, on a home page with contents created using normal HTML, both a background color and character font color can be designated unlike CHTML. However, when browser software which runs on a terminal supports only CHTML specifications, such browser can display a background color but renders character font as a monochrome (e.g., black) image while ignoring a color designated for the character font; it adopts a rendering method that renders a background color in a designated color but character font in a single color such as black or the like.

FIG. 8 will be described below. FIG. 8 is an explanatory view when the present invention is applied to the prior art shown in FIG. 7.

The right image in FIG. 8 depicts a case wherein color contents are printed as a monochrome image by the recording apparatus of this embodiment. The left image in FIG. 8 depicts source contents data as in the left image of FIG. 7.

As shown in the right image of FIG. 8, in this embodiment, rendering data corresponding to a background portion of character font is set to be white single color. That is, even when HTML data downloaded from contents has a description of background designation, that designation is ignored, and a process for replacing a background color by white single color is executed. Also, as for character rendering data, a process for rendering character font in a single color such as black or the like is executed independently of color designation associated with character font in the source data.

As described above, according to this embodiment, a color print process is executed using color inks without losing color information of the color contents. On the other hand, upon executing a monochrome print process, HTML data is analyzed while ignoring a description of color information in the received HTML data, and recording bitmap data which does not contain any color information is generated and printed. In this manner, color contents can be printed using a monochrome ink only without impairing the print output quality of character data.

As a result, an apparatus which can achieve both the functions, i.e., which can rasterize and print an image equivalent to that displayed on the screen as recording data without impairing design and colors of contents upon printing color contents, and can print a background image and character font without overlapping them upon printing contents using a monochrome ink, can be provided.

In this embodiment, a background image is canceled in the monochrome print mode. However, the present invention is not limited to this. For example, only a background image may be canceled when the user makes background image cancel operation in the color print mode. In this case, both characters and images such as photos and the like can be printed in color to be easy to view.

In place of completely canceling a background image and converting it into a white background, a background image may be printed with a lower density. With this process, characters stand out on a light background. In case of the color print mode, a background image may be converted into a monochrome image with a lower density. Furthermore, in this embodiment, a character image is converted into black. However, the present invention is not limited to this. For example, when a character image is converted to have a density higher than the background image density, the character legibility improves.

Moreover, only a background color or background image portion present around each character may be converted into a white image or an image with a lower density.

Second Embodiment

A recording apparatus with a Web browser function according to the second embodiment of the present invention will be described below.

The recording apparatus of this embodiment detects a tag (background tag or the like) that indicates background data which is to be laid out on the back side of image or character data from received HTML data for one page in advance, and rasterizes character data to an image in accordance with the color of the background data, upon converting character data into an image. Since other arrangements and operations are the same as those in the first embodiment, the same reference numerals denote the same building components, and a description thereof will be omitted.

Figure 9:
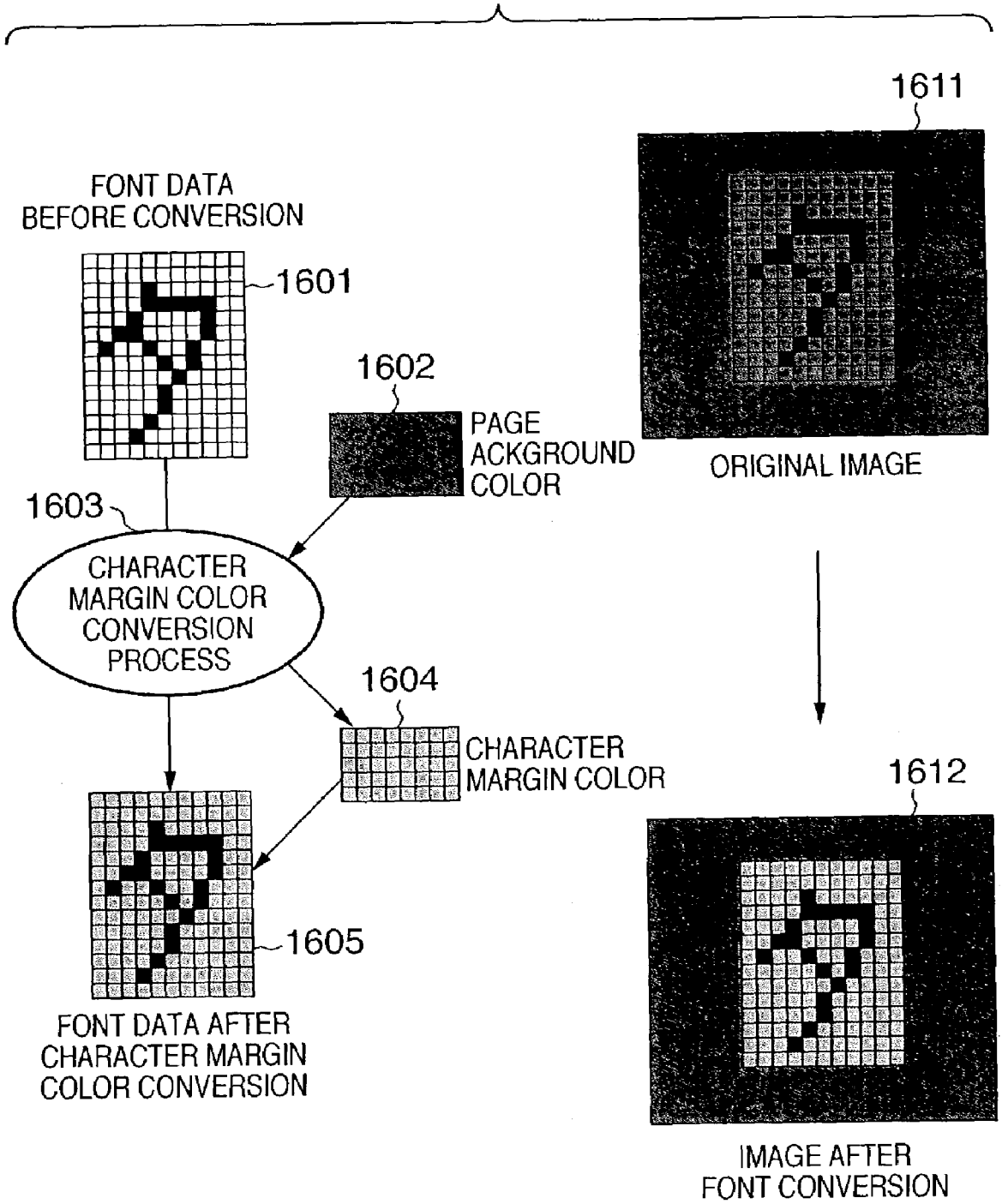
FIG. 9 is a view for explaining a character margin white conversion of a recording apparatus according to the second embodiment of the present invention.

FIG. 9 is a view for briefly explaining a process for rasterizing character data to an image.

Referring to FIG. 9, reference numeral 1601 denotes font data in a state wherein it is stored in the ROM 101. In this state, in katakana "夕" exemplified in FIG. 9, data is divided into two portions, i.e., a line portion which forms a character, and a character margin portion. That is, the character margin portion means dots other than those which form a character ("夕" in this case) in a region (11×14 dots) that forms the font data.

A value "1" is defined as data for the line portion which forms the character, a value "0" is defined as data for the margin portion, and this character is stored in the ROM as binary font data.

Reference numeral 1602 denotes a page background color, which indicates background data detected from HTML data.

In a conversion process 1603, the font data 1601 before conversion in the ROM, and page background color data 1602 are received, and the color of the character margin portion is converted.

This conversion process is a conversion process of the color of the character margin portion, which sets colors with different densities for the character margin portion and page background color to assure a density difference between the line portion and character margin portion of the font data, thereby making font easy to view.

That is, it is checked if a background color is approximate to a character color. If the background color is approximate to the character color, a character is rasterized to a bitmap image while the color of its character margin portion is converted into one which is not approximate to the character color.

In this conversion process, a character margin color 1604 is determined in consideration of font designation color data and page background color data designated in HTML data. Then, font data in the ROM is rasterized to a bitmap image so that its margin portion has the determined character margin color 1604, and the font line portion has the font designation color designated in the HTML data, thus generating the font data as a print image.

Reference numeral 1611 denotes an original image of HTML data received from a Web. In this sample, assume that a black character is rendered on a dark-green background.

Reference numeral 1612 denotes a print image that has executed the aforementioned character margin color conversion process. Compared to the original image 1611, a page background portion is rendered in the same dark green, but a portion that bounds a character is rendered in, e.g., light green, and a black character is rendered in that portion.

With these processes, the character edge of the processed image 1612 is viewable more easily than the original image 1611, thus improving the visibility of character information.

Processes of a print method will be explained below using FIG. 10.

Figure 10:
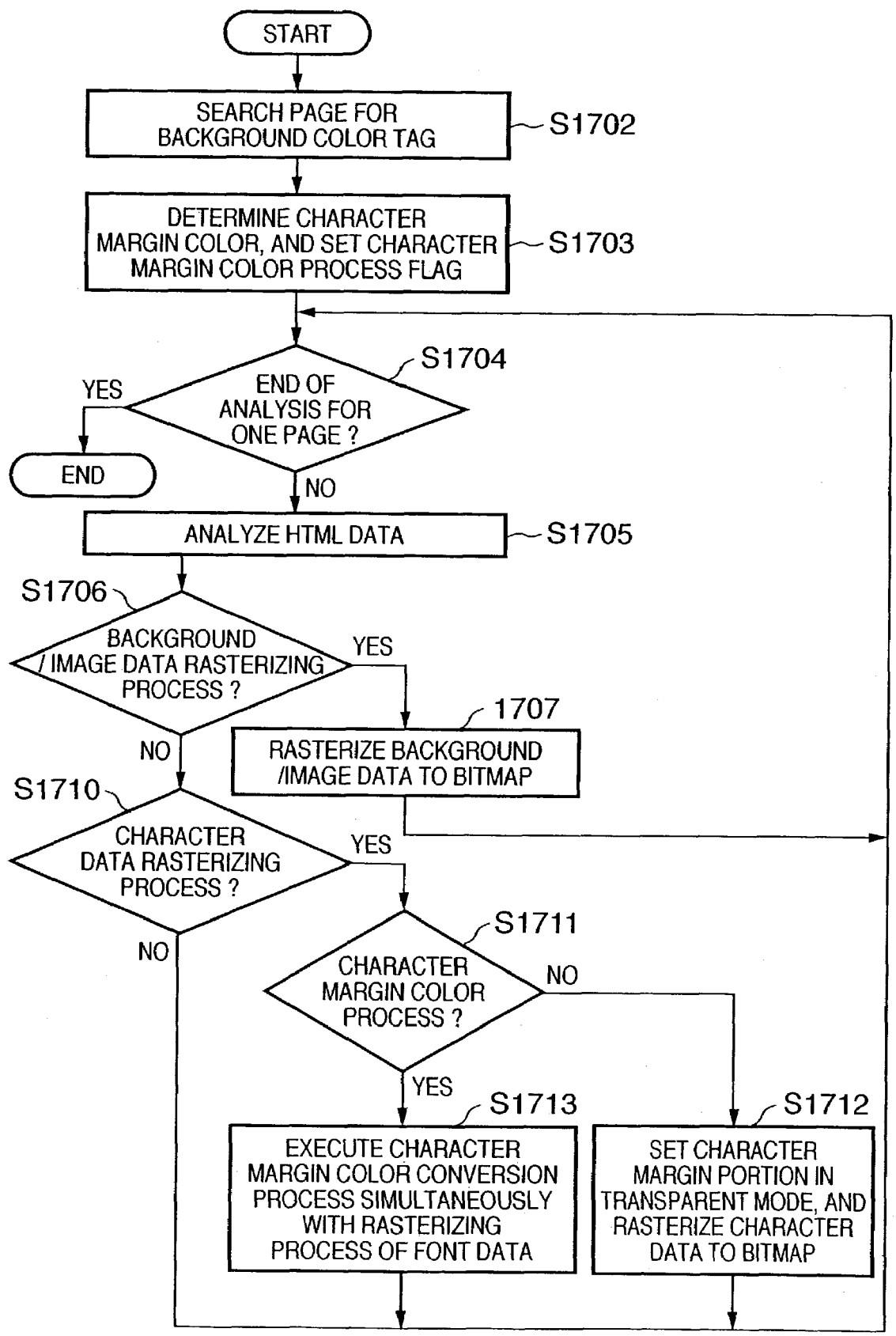
FIG. 10 is a flow chart showing a font rasterizing process of the recording apparatus according to the second embodiment of the present invention.

FIG. 10 is a flow chart that pertains to processes for receiving HTML data, and rasterizing font data to a character image.

If the user has pressed the function key 403 on the control panel to make a predetermined print start operation while displaying a given home page, an HTML data analysis process shown in FIG. 10 starts.

In step S1702, the received HTML data is searched for a background color tag in a page to acquire page background color information. In this embodiment, the background color tag is searched. Also, even when a background of a page is image data, a character margin portion process to be described below can be executed under the assumption that tag data of a specific background color (e.g., gray or the like) is designated. In such case, the effect of improving the character visibility can be obtained even when characters overlap image data.

In step S1703, a character margin color is determined, and a character margin color process flag is set. In the recording apparatus of this embodiment, when characters are to be printed in black independently of source data, the background color data acquired in step S1702 is converted into a monochrome grayscale value, and the necessity of a character margin color conversion process and the margin color itself are determined on the basis of whether or not the converted value is approximate to black.

If the number of gray levels upon converting background color data into a monochrome grayscale value is 256, when the monochrome grayscale value obtained by converting the background color exceeds a specific value (e.g., 128) of 256 gray levels, it is determined that the converted value is approximate to a black value, and that a character margin color conversion process is to be executed. Then, the value of a character margin color is set to be, e.g., 128.

That is, if the background color data acquired in step S1702 is approximate to black like, e.g., dark gray, the character margin color process flag is set, and a color obtained by reducing the density of the background color is set as a character margin color.

Alternatively, the following control may be made. That is, when a page background color is acquired in HTML data, the character margin color process flag is always set; when a page background color cannot be acquired in HTML data, the character margin color process flag is not set. In such case, a character margin color process is executed unless a background color is white.

It is checked in step S1704 if analysis for one Web page is complete.

If it is determined in step S1704 that analysis for one Web page is not complete yet, the flow advances to step S1705 to analyze HTML data. More specifically, the HTML data analysis core unit 401 analyzes HTML tags of contents data. As a result of analysis of tags, if a tag (background tag or the like) that indicates background data which is to be laid out on the back side of image or character data is detected, the flow advances from step S1706 to step S1707 to start a rasterizing process of background and image data. Upon completion of the process for one tag data, the flow returns to step S1704.

As a result of analysis of HTML data in step S1705, if a tag indicating character data is detected, the flow advances from step S1710 to step S1711 via step S1706 to determine whether or not a character margin process is to be executed.

Whether or not the font margin process is to be executed is determined in step S1711 on the basis of the state of the character margin color process flag set in step S1703. If the flag is set, it is determined that the character margin color conversion process is to be executed, and the character margin color conversion process is executed in step S1713.

In step S1713, the character margin color conversion process that has been explained in FIG. 9 is executed for each character, and is repeated in correspondence with the number of characters contained in HTML data, thus attaining a character margin color conversion process for a character string. After the conversion process of the character string, an actual rendering process is executed, and the flow returns to step S1704.

If it is determined in step S1711 that the character margin color conversion process is not executed, the flow advances to step S1712. In step S1712, a process for rasterizing character data to bitmap data while setting a character margin portion in a transparent mode is executed. Since this process is the conventional font rasterizing process, a description of the processing method will be omitted. Consequently, a process for rasterizing character data in a designated color on a designated background is executed.

By repeating steps S1702 to S1713 in this way, a rasterizing process for one Web page is executed.

If it is determined in step S1704 that analysis for one Web page is complete, the rasterized character, image, and background data are combined and recorded on a recording medium, and a print end process is then executed.

In FIG. 10, a character is printed in black independently of source data. However, the present invention is not limited to such specific process, and can be applied to a case wherein a print process is made according to font color tags in HTML data. In such case, the process in step S1703 is executed immediately before step S1711. In step S1703, character and background colors are compared. If these colors have the same color appearance and their density difference falls within a predetermined range, the character margin color process flag is set to convert a character margin color into a color which has the same identical color appearance as the background color, and has a density difference from the character color, which is equal to or larger than a predetermined value.

<Print Example>

FIG. 11 shows an image when a Web page is printed by a conventional apparatus. In this sample, when characters in a dark color are laid out on a dark background color, the character visibility becomes poor.

Figure 12:
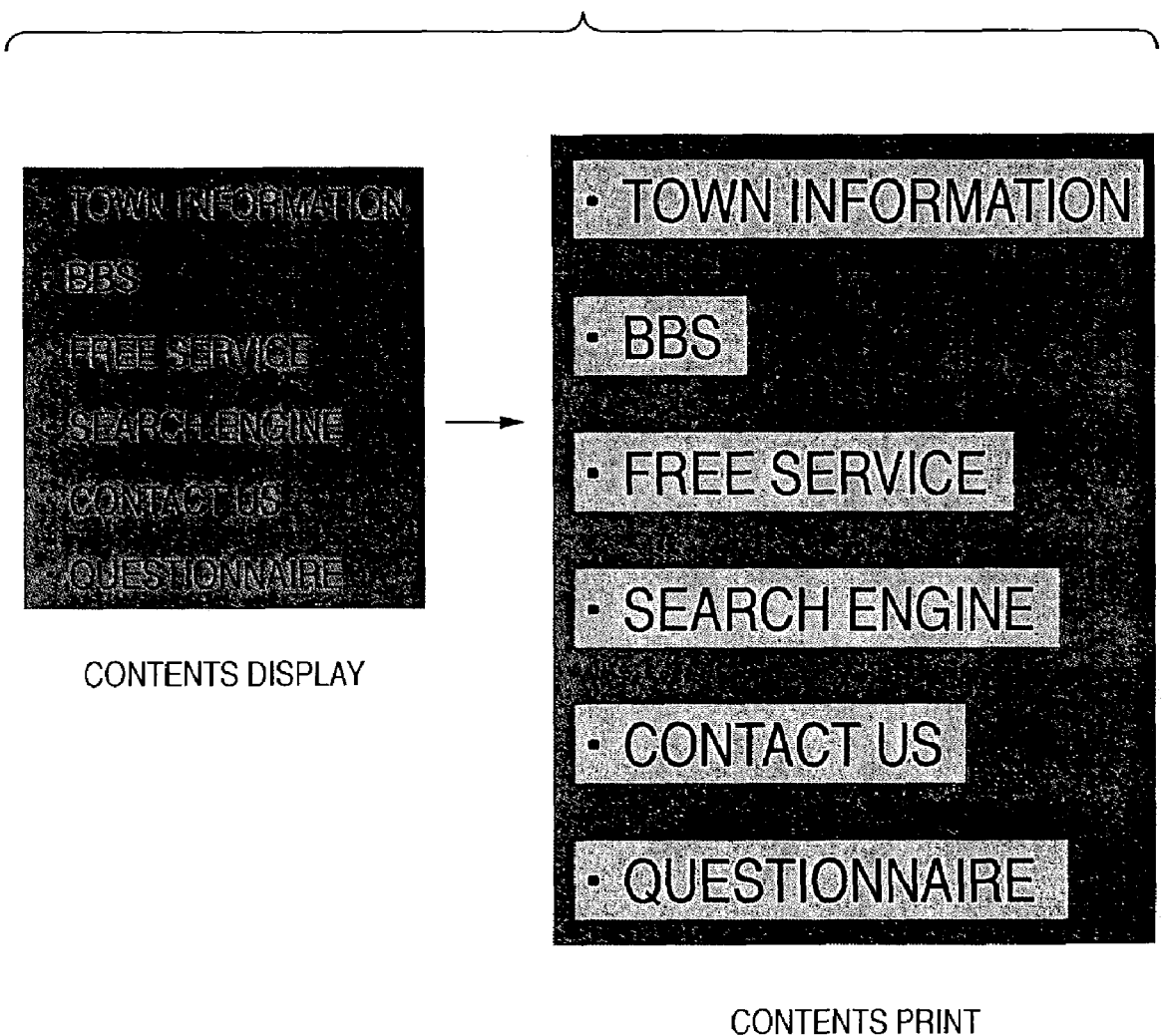
FIG. 12 shows a sample of a contents print result of the recording apparatus according to the second embodiment of the present invention.

FIG. 12 shows an image when the same Web page as in FIG. 11 is printed using the recording apparatus according to this embodiment. As can be seen from FIG. 12, although characters in a dark color, which is designated in HTML data of a Web page, are laid out on a dark background color, which is also designated in the HTML data, since the color conversion process of a character margin portion is executed, the character visibility is high.

Figure 13:
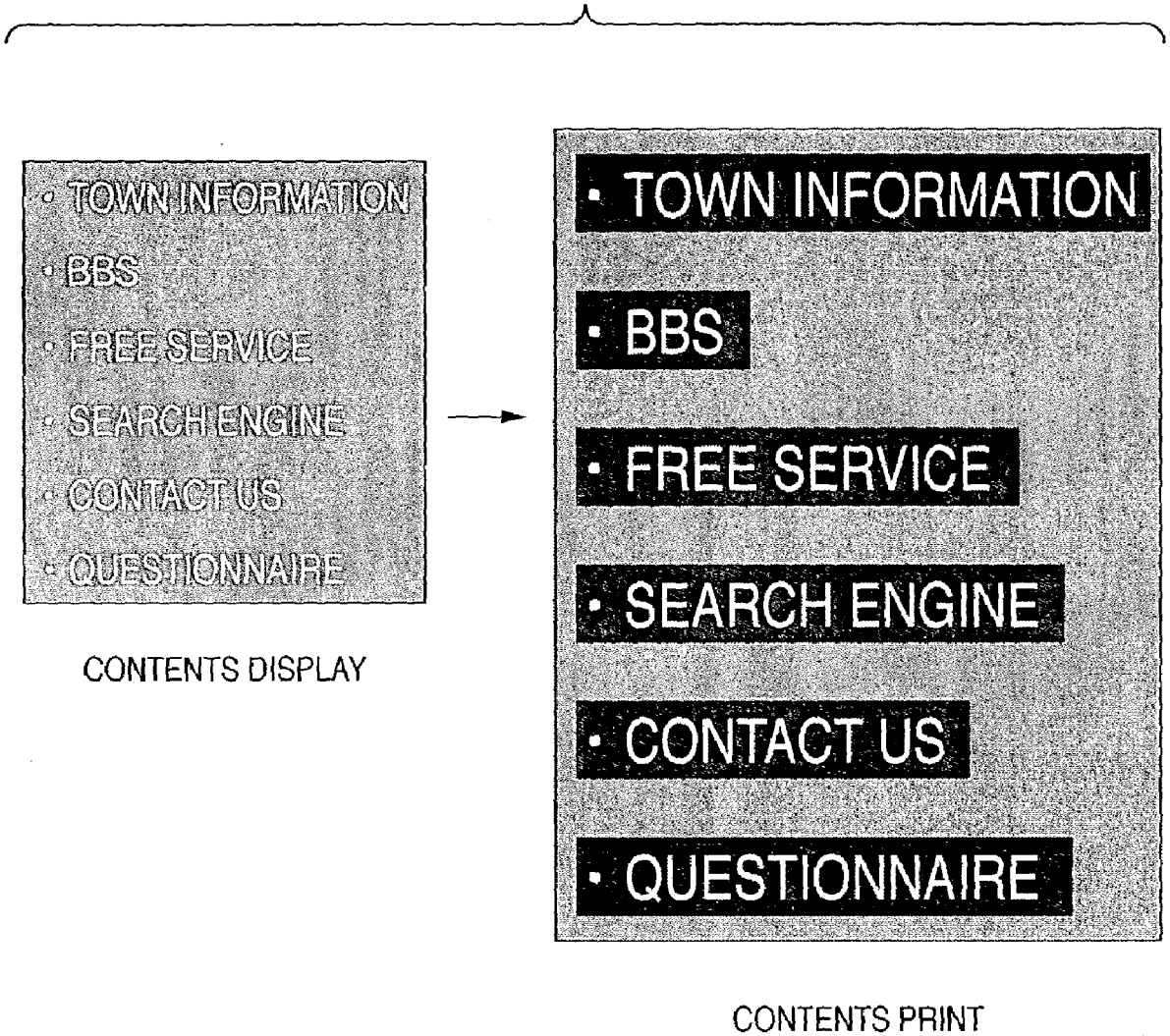
FIG. 13 shows another sample of a contents print result of the recording apparatus according to the second embodiment of the present invention.

FIG. 13 reveals that the character visibility can be improved by setting the color of a character margin portion to be darker without changing color designation of the background and character colors on a Web page on which characters in a light color are laid out on a light background color, contrary to FIG. 12.

In order to derive the results shown in FIGS. 12 and 13, the following process can be executed in addition to the process that has been explained in FIG. 9. That is, when a character color has a predetermined density or higher, its character margin color is converted into a color obtained by reducing the density of a background color; when a character color has a density less than the predetermined density, its character margin color is converted into a color obtained by increasing the density of a background color.

With the conventional apparatus, even when the user feels on the display of a terminal that the character visibility of the display contents of a Web page is not so low, he or she may experience a drop of visibility due to a visual contrast difference between the background and character colors generated as a result of printing the Web page.

However, the process of this embodiment can improve the visibility, and even when a Web page is printed, the character legibility can be prevented from deteriorating.

With the recording apparatus of this embodiment, the background and character colors themselves remain the same as those designated in HTML data of a Web page, in addition to the effect of preventing the character legibility from deteriorating.

In this manner, when the background color in a Web page serves its purpose in terms of the contents of the page, or when only a specific portion of a character color in a page is changed, and a font color serves its purpose like "a red-character portion has been changed" in the contents of the page, the character visibility can be improved without disturbing such contents.

In this embodiment, when the character and background colors have close densities, the character margin color conversion process is executed. When the recording unit executes a color print process, the character margin color conversion process needs to be executed only if the character and background colors are approximate colors. Hence, if the character and background colors have approximate densities but are quite different colors, the character margin color conversion process may be disabled.

Another Embodiment

The present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

As described above, according to the aforementioned embodiments, a recording apparatus, recording method, program, and storage medium, which can print a document described in a markup language to be easily viewable can be provided.

The present application claims priority from Japanese Patent Applications Nos. 2002-081253, 2002-229017, which is incorporated herein by reference.

As many apparently widely different embodiments of the present invention can be made without departing from the spirit and scope thereof, it is to be understood that the invention is not limited to the specific embodiments thereof except as defined in the appended claims.

What is claimed is:

1. A printing apparatus comprising:
    receiving means for receiving, from a Web server, document data described in a markup language;
    analysis means for analyzing tags included in the document data and discriminating between background data and character data on printing;
    conversion means for converting the background data discriminated by the analysis means into a white color, and converting the character data into a monochrome bitmap image when the printing apparatus is in a monochrome mode;
    combining means for combining the background data converted into a white color with the character data represented as the monochrome bitmap image; and
    printing means for printing a monochrome image based on the combined data in the monochrome mode, each time said analysis means finishes analyzing one Web page of the document data.

2. The apparatus according to claim 1, further comprising determination means for determining whether a print mode is the color mode or the monochrome mode, in accordance with a type of printing material storage unit installed in the printing apparatus.

3. The apparatus according to claim 2, further comprising determination means for determining whether a print mode is a color mode in which said recording means records a color image, or a monochrome mode in which said recording means records a monochrome image,
    wherein when said determination means determines the monochrome mode, said first and second conversion means automatically execute data conversion, and said recording means records the image on the basis of the first and second image data, and
    wherein when said determination means determines the color mode, said recording means records the image on the basis of the background and character data.

4. The apparatus according to claim 3, wherein said determination means determines the color mode or the monochrome mode in accordance with a type of recording material storage means set in said recording means.

5. The apparatus according to claim 3, further comprising setting means for setting said recording means in the color mode or the monochrome mode, wherein said determination means determines the color mode or the monochrome mode in accordance with setting contents of said setting means.

6. The apparatus according to claim 1, further comprising:
    setting means for setting the color mode or the monochrome mode; and
    determination means for determining whether a print mode is the color mode or the monochrome mode, in accordance with setting of the setting means.

7. The apparatus according to claim 1, further comprising display means for displaying an image in color.

8. The apparatus according to claim 1, further comprising display means for displaying an image in color.

9. The apparatus according to claim 1, wherein said conversion means includes:
    determination means for determining, as a result of analysis of said analysis means, whether or not the background and character colors are approximate to each other;
    first rasterizing means for, when said determination means determines that the background and character colors are approximate to each other, rasterizing the character data extracted from the document data while converting a color of a character margin portion not to be approximate to the character color; and
    second rasterizing means for rasterizing the background data extracted from the document data,
    wherein said recording means combines and records the character and background rasterized by said first and second rasterizing means on a recording medium.

10. The apparatus according to claim 9, wherein when the character color has not less than a predetermined density, said first rasterizing means converts the color of the character margin portion into a color obtained by reducing a density of the background color, and when the character color has a density less than the predetermined density, said first rasterizing means converts the color of the character margin portion into a color obtained by increasing the density of the background color.

11. The apparatus according to claim 9, wherein said determination means compares a density obtained upon converting the background color into a monochrome grayscale value, with a density obtained upon converting the character color into a monochrome grayscale value, wherein when a density difference is not more than a first value as a result of comparison, said first rasterizing means converts the color of the character margin portion to a color which has a density difference of not less than a second value with respect to the character color.

12. The apparatus according to claim 9, wherein said determination means includes means for comparing background color data with character color data extracted from the document data.

13. A printing method for printing a color image in a color mode or a monochrome image in a monochrome mode comprising:
    a receiving step of receiving document data described in a markup language from a Web server;
    an analysis step of analyzing tags included in the document data to discriminate between background data and character data on printing;
    a conversion step of convening the background data discriminated in the analysis step into a white color, and converting the character data into a monochrome bitmap image when in the monochrome mode; and
    a combining step of combining the background data converted into a white color with the character data represented as the monochrome bitmap image; and
    a printing step of printing a monochrome image based on the combined data in the monochrome mode, each time said analysis means finishes analyzing one Web page of the document data.

14. A recording method comprising:
    an input step of inputting document data described in a markup language;
    a first extraction step of analyzing the document data to extract background data;
    a second extraction step of analyzing the document data to extract character data;

a first conversion step of converting the background data extracted in the first extraction step into first image data with a first density;

a second conversion step of converting the character data extracted in the second extraction step into second image data with a second density, which is higher than the first density; and a recording step of recording an image on the basis of the first and second image data.

15. A recording method comprising:

an input step of inputting document data described in a markup language;

an analysis step of analyzing the document data;

a determination step of determining, as a result of analysis in the analysis step, whether or not background and character colors are approximate to each other;

a first rasterizing step of rasterizing, when it is determined in the determination step that the background and character colors are approximate to each other, character data extracted from the document data while converting a color of a character margin portion not to be approximate to the character color;

a second rasterizing step of rasterizing background data extracted from the document data; and a recording step of combining and recording a character and background rasterized in the first and second rasterizing steps on a recording medium.

16. A computer readable storage medium storing a program which makes a computer execute:

an input step of inputting document data described in a markup language;

a first extraction step of analyzing the document data to extract background data;

a second extraction step of analyzing the document data to extract character data;

a first conversion step of converting the background data extracted in the first extraction step into first image data with a first density; and a second conversion step of converting the character data extracted in the second extraction step into second image data with a second density, which is higher than the first density.

17. A computer readable storage medium storing a program which makes a computer execute:

an input step of inputting document data described in a markup language;

an analysis step of analyzing the document data;

a determination step of determining, as a result of analysis in the analysis step, whether or not background and character colors are approximate to each other;

a first rasterizing step of rasterizing, when it is determined in the determination step that the background and character colors are approximate to each other, character data extracted from the document data while converting a color of a character margin portion not to be approximate to the character color; and a second rasterizing step of rasterizing background data extracted from the document data.

* * * * *